A. H. MARSH.
MACHINE FOR CUTTING POLYGONAL HOLES.
APPLICATION FILED DEC. 3, 1910.

1,007,127.

Patented Oct. 31, 1911.

6 SHEETS—SHEET 2.

A. H. MARSH.
MACHINE FOR CUTTING POLYGONAL HOLES.
APPLICATION FILED DEC. 3, 1910.

1,007,127.

Patented Oct. 31, 1911.

6 SHEETS—SHEET 3.

Witnesses
Albert A. Hofmann
Elizabeth M. Brown

Inventor
Allan H. Marsh.
By Edward N. Pagelsen
Attorney

A. H. MARSH.
MACHINE FOR CUTTING POLYGONAL HOLES.
APPLICATION FILED DEC. 3, 1910.

1,007,127.

Patented Oct. 31, 1911.

6 SHEETS—SHEET 6.

Witnesses
Albert A. Hofmann
Elizabeth M. Brown

Inventor
Allan H. Marsh
By Edward N. Pagelsen,
Attorney

UNITED STATES PATENT OFFICE.

ALLAN H. MARSH, OF JACKSON, MICHIGAN, ASSIGNOR TO FROST GEAR & MACHINE CO., OF JACKSON, MICHIGAN.

MACHINE FOR CUTTING POLYGONAL HOLES.

1,007,127.  Specification of Letters Patent.  Patented Oct. 31, 1911.

Application filed December 3, 1910. Serial No. 595,363.

*To all whom it may concern:*

Be it known that I, ALLAN H. MARSH, a citizen of the United States, and a resident of Jackson, in the county of Jackson and State of Michigan, have invented a new and useful Machine for Cutting Polygonal Holes, of which the following is a specification.

This invention relates to means for accurately cutting square, hexagonal, octagonal or other polygonal holes in gears, plates or other work, and its object is to provide a machine, which, when properly adjusted will automatically and rapidly cut such polygonal holes, and which may be constructed at comparatively low cost.

This invention consists of a table to hold the work, a polygonal cutter reciprocating at the desired angle thereto, means for carrying the cutter around in a circular path within the hole being cut, and means to turn the cutter to cause its successive sides to form the successive sides of the hole being cut.

Figure 1:
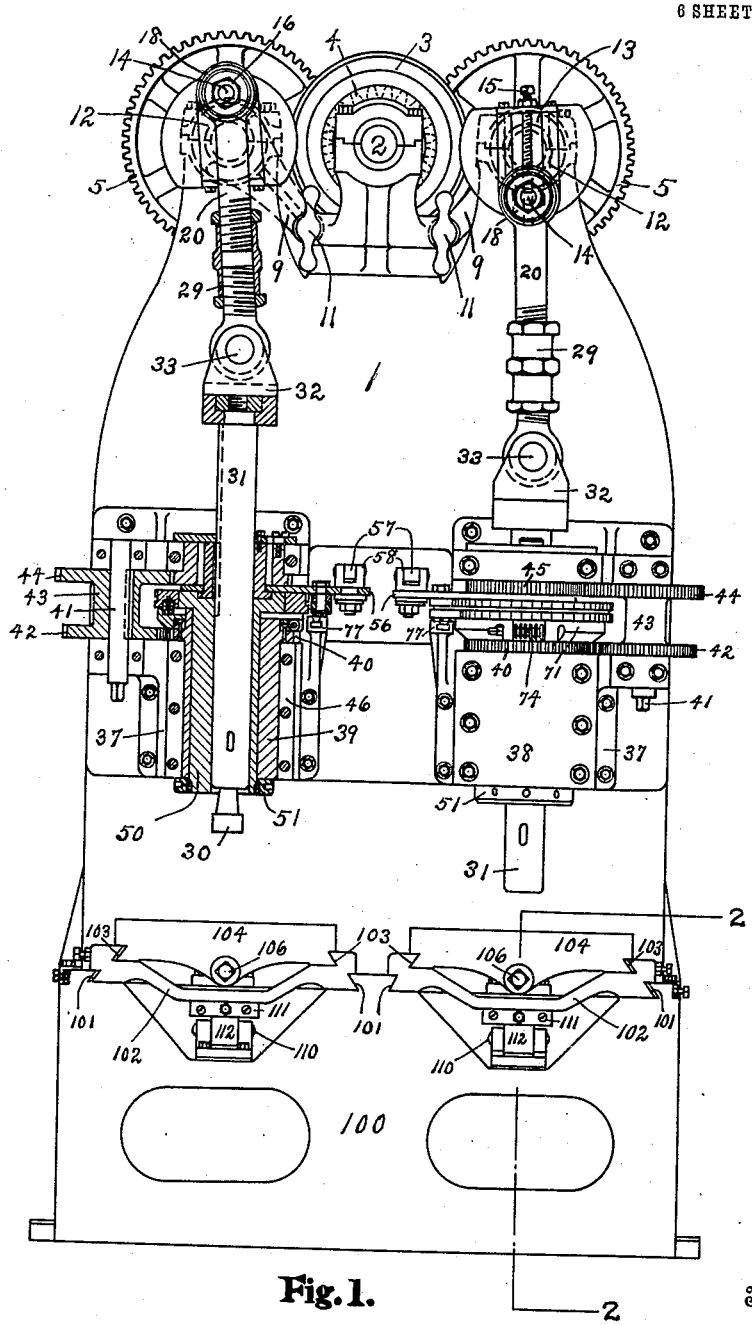
Figure 2:
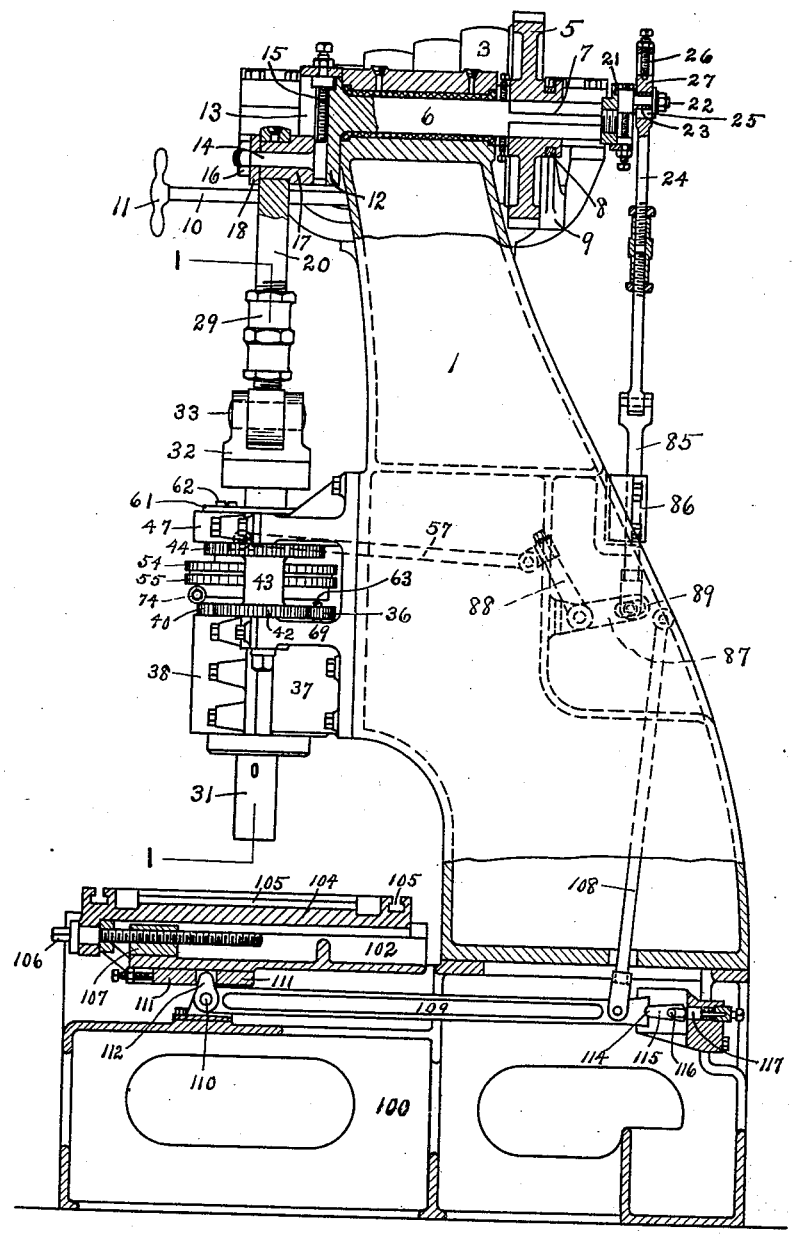
Figure 3:
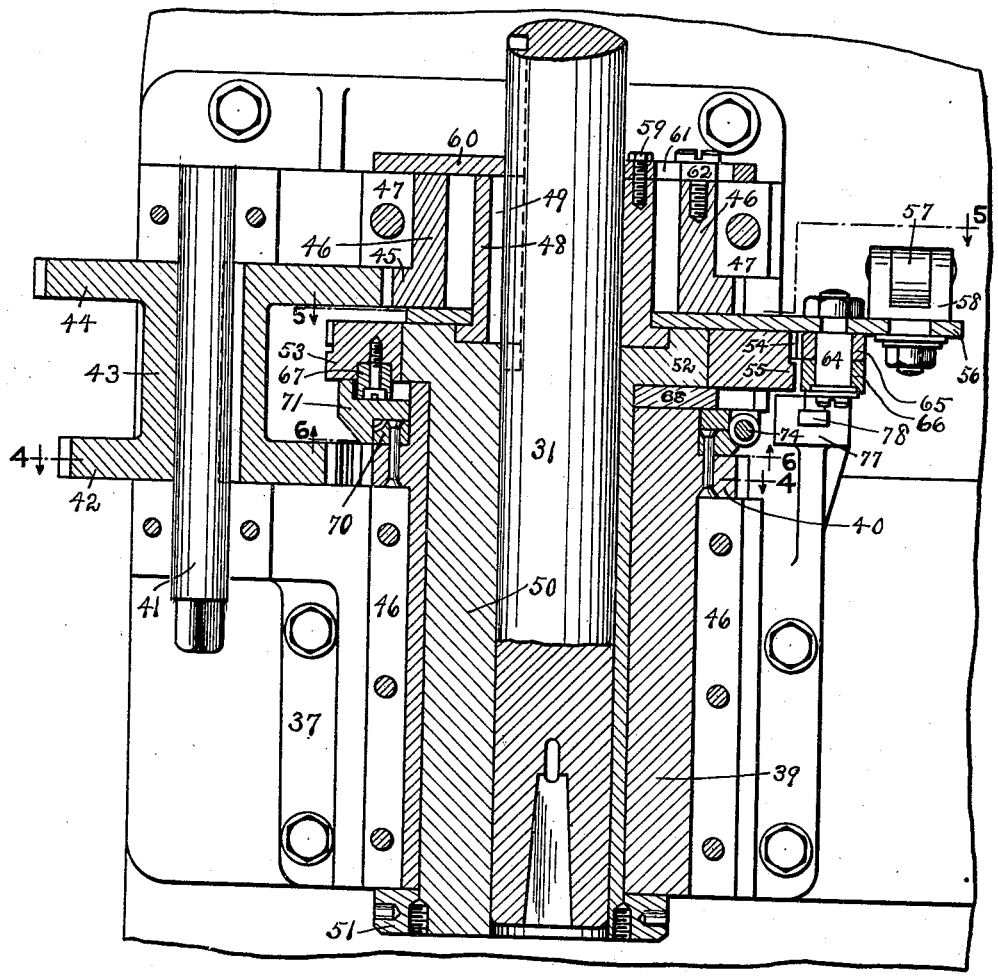
Figure 4:
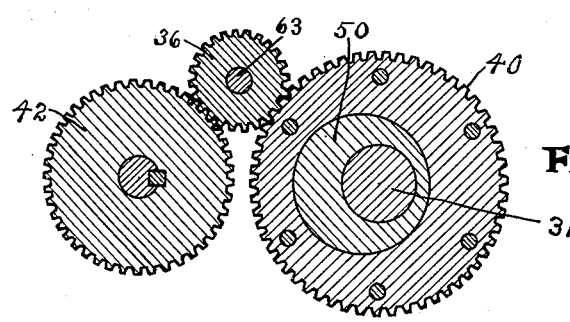
Figure 5:
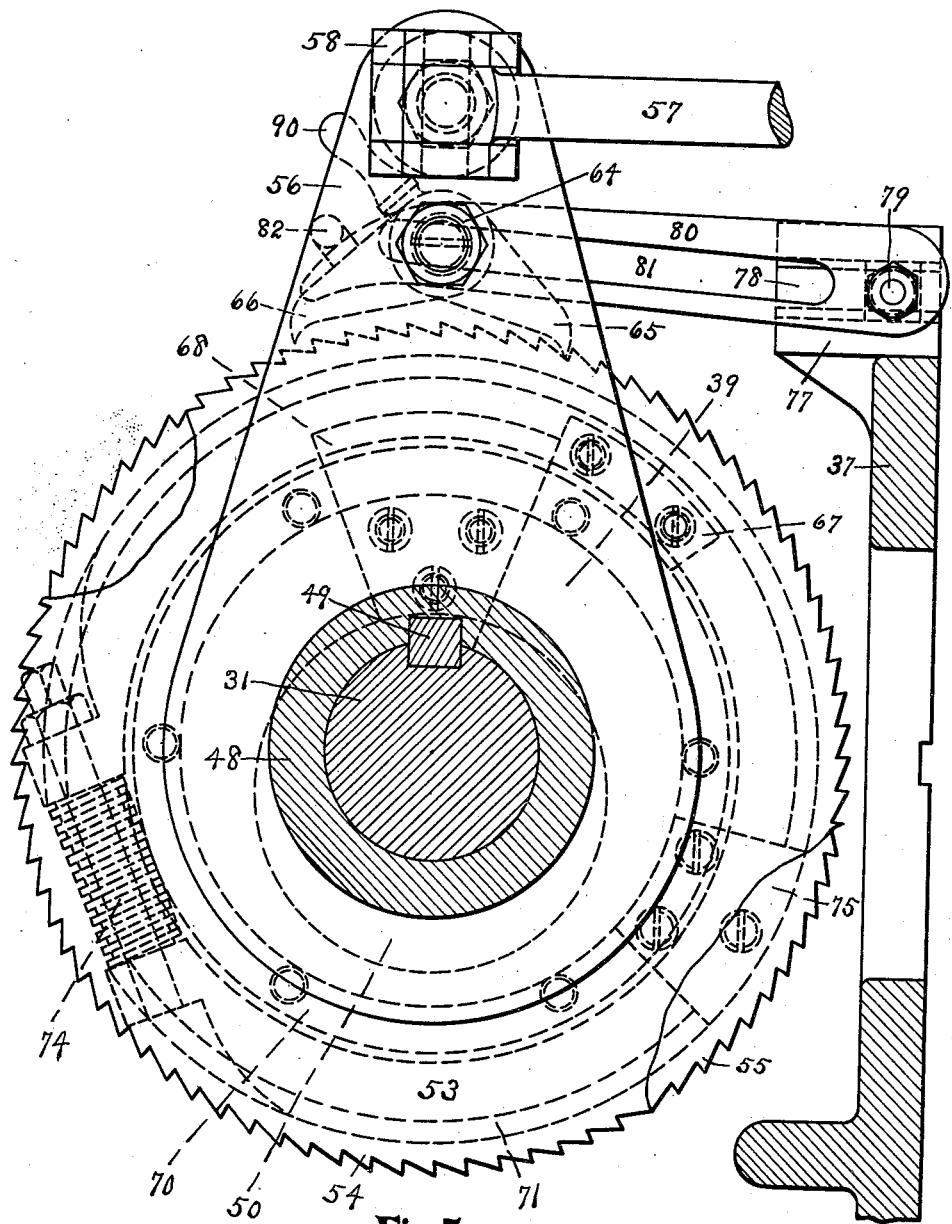
Figure 6:
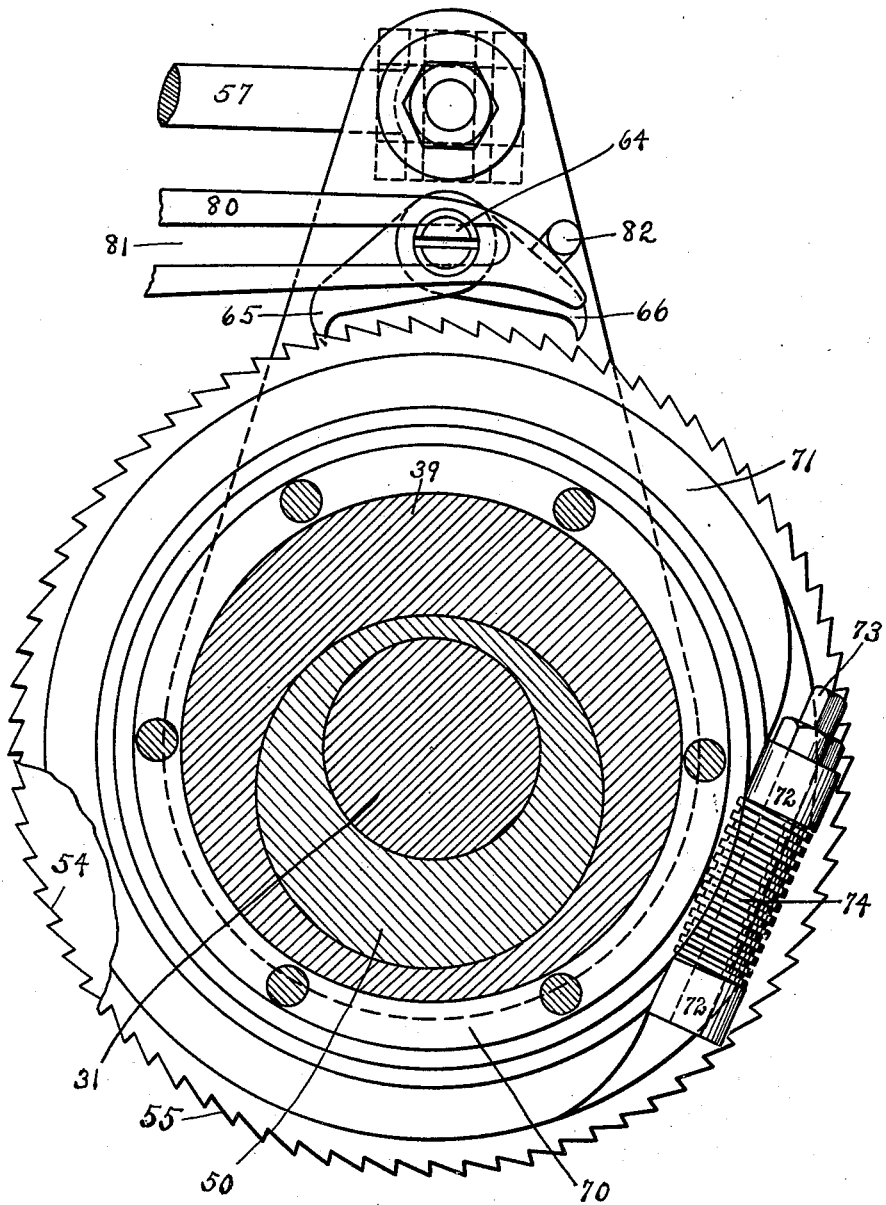
Figure 7:
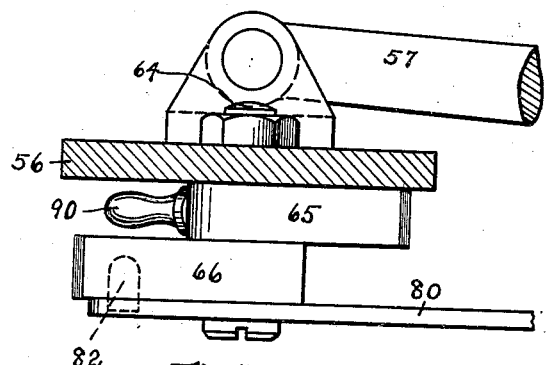

In the accompanying drawings, Figure 1 is a front elevation of this improved machine, part of one side being shown in vertical section on the line 1—1 of Fig. 2. Fig. 2 is a side elevation of the machine, the table and base being shown in vertical section on the line 2—2 of Fig. 1. Fig. 3 is a vertical section also on the line 1—1 of Fig. 2. Figs. 4, 5 and 6 are horizontal sections on the lines 4—4, 5—5 and 6—6 of Fig. 3 respectively. Fig. 7 is a detail of the feeding mechanism. Figs. 8 to 12 inclusive are diagrams of cutters and the work performed.

Similar reference characters refer to like parts throughout the several views.

The machine shown in the drawings is duplex, both sides being alike, the same driving mechanism serving for both and being of any well known construction. The main frame 1 has bearings in which is mounted the shaft 2, on which is secured a cone-pulley 3 and a pinion 4, shown in dotted lines in Fig. 1, which meshes with the gears 5 on the crank shafts 6. These shafts 6 are squared at 7 (Fig. 2) and the gears have collars 8 engaged by the arms 9 on the rods 10. Handles 11 on the front ends of these rods permit the operator to slide the gears 5 into and out of mesh with the pinion 4 at will to start and stop each of the mechanisms. As this construction is well known, it may be said that any desired means may be employed to revolve the shafts 6.

On the front end of each shaft 6 is a crank 12 having a T-slot 13 in which is slidable the bolt 14. A screw 15 engages the bolt to position the same while the nut 16 on the end of the bolt engages the washer 18 and sleeve 17 and holds them firmly in position to form the crank-pin for the connecting rod 20. On the rear end of each shaft 6 is a similar construction, consisting of the crank 21, bolt 22, and sleeve crank-pin 23. The connecting rod 24 has a slot 25 so that the pin 23 may move therein for reasons to be explained later. A screw 26 and block 27 limit the movement of the pin 23. The drawing is not exactly correct, as the two cranks on the same shaft are at an angle to each other, but for sake of clearness, they have been shown opposite. The front crank operates the cutter and the rear crank controls the feed. As the bottom of the work will usually be at the top of the table, irrespective of its thickness, the lower end of the stroke of the cutter will therefore be the same. An adjusting turn-buckle 29 forms part of the connecting rod and controls its length.

The cutter 30 is mounted in the lower end of the spindle 31, whose upper end is revolubly mounted in the knuckle 32 to which the connecting rod 20 joins by means of the pin 33.

Figure 8:
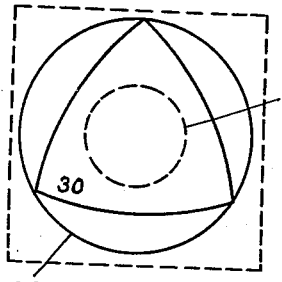
Figure 9:
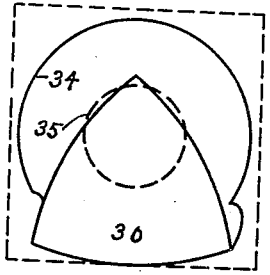
Figure 10:
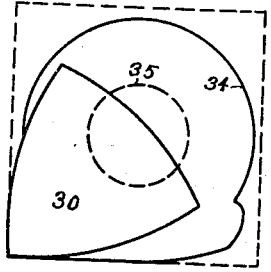

The operation of cutting a square hole is illustrated in Figs. 8, 9 and 10 where the square is indicated in dotted lines. A round hole 34 is first drilled to admit the cutter 30, (Fig. 8) which reciprocates up and down while being swung out to the position shown in Fig. 9. The spindle 31 is then carried around a path 35 while it is turned in the opposite direction on its own axis, so that at the end of a proper number of strokes, depending on the feed, the position shown in Fig. 10 is reached. It must be understood that the rate of feed can be varied as desired, that the machine is set in advance to determine how far the cutter shall swing out as indicated in Figs. 8 and 9, and that the relative movements of the cutter on its own axis and along the path 35, absolutely determines the shape of the hole. The diameter of the path 35 is predetermined by the amount of revolution of one eccentric sleeve within another, the size of the hole by this movement, and the size of the cutter, while the shape of the hole depends upon the relative revolutions of the outer eccentric sleeve and of the cutter on its own axis and on the shape of the cutter.

Projecting from the main frame 1 of the machine are the heads 37 having caps 38, in each of which is revoluble the outer eccentric sleeve 39 having a fixed collar 40 above its bearing 46. The collar 40 is in the form of a gear, which meshes with the idler gear 36 on the stud 63, and this meshes with pinion 42 on the spool 43, at the upper end of which is a pinion 44 which meshes with the gear 45. The spool is mounted on the fixed shaft 41. See Fig. 3. This gear 45 is at the lower end of a sleeve 46 which is also revoluble in bearings 47, on the head 37. The hole in this sleeve 46 is large enough to permit the spindle and its driving sleeve 48 to move freely. A feather 49 connected to this sleeve 48 slides in a slot in the spindle, and the lower end of the sleeve is revolubly supported in a depression in the upper end of the inner eccentric bushing 50. This inner bushing rides on the upper end of the outer bushing 39 and a collar 51 on its lower end holds both bushings in position. Secured to a flange 52, at the upper end of the inner bushing, is a ring 53 having oppositely extending ratchet teeth 54 and 55, shown in Figs. 5 and 6. The feed plate 56 is mounted just above the toothed ring 53 and is reciprocated by means of the rod 57 and the crank 21 through mechanism to be explained later on, the stroke of this plate being determined by the screw 26. The rod 57 connects to the block 58, pivoted to the plate as shown in Figs. 3 and 5. This plate may be held down by the sleeve 46. Secured to the sleeve 48 by means of a screw 59 is a plate 60 which rides on the sleeve 46 and has a slot 61 through which the bolt 62 passes, which bolt is in engagement with the sleeve 46. When the outer bushing 39 is turned, as will be explained later on, the gear 40 will turn the spool 43 and the sleeve 46 through the intermediate idler gear 36 on the pin 63 projecting upward from the flange 69 on the head 37. The plate 60, connected to the sleeve 48 and thereby to the spindle, acts as a crank of which the bolt 62 is the crank pin, so that the spindle will revolve at the same rate as the sleeve 46. The sleeve 46 is revoluble in fixed bearings 47 while the spindle is mounted in the inner bushing 50. The slot 61 permits the spindle to move laterally relative to the sleeve 46 and still be revolved thereby.

Figs. 8, 9 and 10 indicate that the movement of the spindle will be three-fold. First, a lateral movement to get the required eccentricity, that is, to carry its center to the path 35; second, a movement in the path 35; and third, a reverse rotation on its own axis equal to the number of sides of the hole, divided by the number of sides of the cutter, times a full revolution. The last has been explained, being caused by the turning of the outer bushing and by means of the gears 40, 36, 42, 44 and 45, the collars 46 and 48 and the plate 60. The second movement is also caused by the turning of the outer eccentric bushing 39. The first movement, that of attaining eccentricity is caused by the turning of the inner bushing within the outer which is accomplished as follows.

On the feed plate 56 is mounted a pin 64 which carries the spring-held pawls 65 and 66. The upper pawl engages the upper teeth 54 of the ring 53 so that as the plate reciprocates the inner bushing 50 will be turned (to the right in Fig. 5). A stop or shoulder 67 is secured to the ring 53 and a second stop 68 is mounted on the upper end of the outer bushing 39. When these two stops are in engagement, as shown in Fig. 5, the spindle and outer bushing 39 will be concentric, the eccentricities of the two bushings being the same. Turning the inner bushing within the outer will carry the spindle outward. On the outer bushing is secured a worm-gear 70 and around this worm-gear is revoluble the ring 71 which has lugs 72 carrying the shaft 73 to which is secured the worm 74 which meshes with the worm-gear. See Fig. 6. The ring 71 carries a stop or shoulder 75 which is in the path of the stop 67. Turning the shaft 73 of the worm 74 will position the stop 75 with reference to the stop 68 and thus limit the movement of the inner bushing within the outer. As the feed plate reciprocates, the ring 53 and the inner bushing will turn, (to the right in Fig. 5) carrying the spindle outward until the stop 67 engages the stop 75 on the ring 71. As the ring 71 is locked to the outer bushing through the worm 74 and worm-gear 70, any further turning of the inner bushing will cause the outer bushing to turn. This results in first carrying the cutter from the position shown in Fig. 8 to that in Fig. 9, and next, because of the common movement of both bushings, from the position in Fig. 9 to that in Fig. 10. At the same time, because of the gears 40, 36, 42, 44 and 45, the cutter turns back on its own axis one and one-third of a revolution at each full revolution of the outer bushing.

The materials worked on, such as nickel-steel transmission-gears for automobiles, are often very hard, so that the cutter must be exceedingly hard. It is therefore desirable to move the tool away from the work on the upstroke to avoid breaking off the cutting edge of the tool. To do this, the inner bushing is turned back a trifle just before the tool begins to rise. Projecting from the head 37 is a lug 77 which has a slot 78 in which is slidably secured the bolt 79. A guide-bar 80 is mounted on this bolt and has a slot 81 so it may move with the bolt 64. The end of this guide-bar is beveled and engages the pin 82 which projects down from the pawl 66. The parts being properly adjusted, and the plate 56 moving back (to the left in Fig. 5), the pawl 66 will be held away from the teeth 55 until near the end of the stroke of the plate, when it will engage the teeth 55 and turn back the ring 53 and the inner bushing. This will slightly decrease the eccentricity of the spindle and move the tool back from the work on its up-stroke.

The cranks 12 and 21 are at such an angle to each other, and the slot 25 in the connecting rod 24 is of such length that during the cutting operation the ring 53 will be stationary, that during the period the cutter is below the lower face of the work, the pawl 66 will turn back the inner bushing, that while the tool is rising through the work the bushing is again at rest, and while the pin 17 is traveling the upper portion of its path the pawl 65 turns both bushings to feed the tool forward.

The feeding connections consist of a slidable bar 85, mounted in the guide 86, having its upper end connected to the rod 24 and its lower end to the arm 87 of a bell-crank, the other arm 88 of which connects to the rod 57. The arm 88 has a slot to receive the pin 89 on the bar 85.

To return the parts, the pawl 65 is disengaged, which may be done by means of the handle 90, (Fig. 7) when the eccentric bushing 50 can be readily turned back by hand until its stop 67 engages the stop 68 on the inner bushing.

Figure 11:
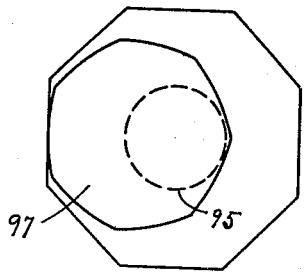
Figure 12:
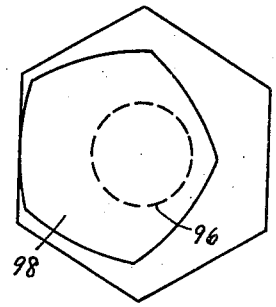

Polygonal holes of any number of sides may be cut by means of a proper tool and the proper gears 40, 36, 42, 44 and 45. The paths 95 and 96 of the tools 97 and 98, in Figs. 11 and 12, are determined by the worm 74, worm-gear 70, and the stops 67 and 75.

Figs. 1. and 2 illustrate a table to receive the work, which is so constructed that the machine may be employed as an ordinary slotting machine. The base 100 has dove-tail guides 101 for the tables 102, which are in turn provided with similar guides 103 for the face-plate 104. These face-plates have proper slots 105 for securing-bolts, and each may have a screw 106 which enters the nut 107 mounted on the table. Each face-plate may therefore be properly positioned with reference to its spindle.

In ordinary slotting operations, the pin 89 will be disconnected from the arm 87 of the bell-crank and be connected to the rod 108, which couples to the long arm 109 of a lever pivoted at 110, the short end 112 of which engages between the adjustable jaws 111 of its table 102. By this construction, the work will be moved forward away from the cutter at each upward stroke of the cutter, thus saving the cutting edge, and then back before the cutter reaches the work on its down-stroke.

To hold the tables and face-plates from moving when the machine is used to cut polygonal holes, each long arm 109 is provided with a notch 114 which receives a tongue 115 on the pin 116. A spring-held bolt 117 presses this tongue 115 into this notch 114 and thus holds the arm 109 stationary. This securing device is not sufficiently strong to resist the action of the rod 108. The work may also be held rigidly in place by locking table 102 to the base 100, by means of the gib-screws shown in Fig. 1, in which case the rod 108 would have to be disconnected from the pin 89 as shown in Fig. 2.

The details of construction and proportions of parts may be changed by skilled designers without departing from the spirit of my invention.

The proportions of the gears 40 and 42, 44 and 45 can easily be calculated by expert tool-makers. It may however, be desirable to specify the gears which may be employed for cutting many-sided holes with a three sided cutter although others may be employed to give the same movements. It must be remembered however, that the sides of the cutter must be properly formed to produce perfectly flat surfaces.

| Sides. | Teeth in gear 40. | Teeth in gear 42. | Teeth in gear 44. | Teeth in gear 45. |
|---|---|---|---|---|
| 4 | 40 | 60 | 33 | 66 |
| 5 | 40 | 45 | 36 | 48 |
| 6 | 40 | 40 | 40 | 40 |
| 7 | 44 | 33 | 40 | 40 |
| 8 | 50 | 30 | 40 | 40 |
| 9 | 50 | 25 | 40 | 40 |

For cutters having more than three sides, other gears would be necessary, as the ratios of the sides of the hole to that of the cutter must always be the basis of the proportions of the gears. The small intermediate gear 36 has no effect on these proportions and may be of any desired size.

Having now explained the construction of the machine, what I claim as my invention and desire to secure by Letters Patent is:—

1. In a machine for cutting polygonal holes, the combination of a frame, a table to support the work, a spindle, a cutting tool at the end thereof, means to reciprocate the spindle to carry the tool through cutting strokes, means to intermittently move the spindle in a circular path at each reciprocation, and means to turn the spindle on its axis a portion of a revolution at each reciprocation.

2. In a machine for cutting polygonal holes, the combination of a frame, a table to support the work, an eccentric bushing, a spindle mounted in said bushing, a cutting tool in the end thereof, means to reciprocate the spindle in the bushing to carry the tool through cutting strokes, means to intermittently revolve the bushing to carry the spindle in a circular path at each reciprocation of the tool, and means to revolve the spindle on its axis.

3. In a machine for cutting polygonal holes, the combination of a frame, means to support the work, a bushing revoluble in the frame, means to intermittently revolve the bushing, a spindle eccentrically mounted in said bushing, means to reciprocate the spindle in the bushing, a polygonal cutter mounted in the end of the spindle and having a smaller number of sides than the hole to be cut, and intermittently acting means to revolve the spindle on its axis in the direction opposite to the bushing at each reciprocation.

4. In a machine for cutting polygonal holes, the combination of a frame, means to support the work, a bushing revoluble in the frame, intermittently acting means to revolve the bushing, a spindle mounted in said bushing, means to reciprocate said spindle, means to intermittently move the spindle within the bushing so its axis will be eccentric to that of the bushing, a cutter mounted in the end of the spindle, and means to revolve the spindle on its axis a portion of a circumference at each reciprocation.

5. In a machine for cutting polygonal holes, the combination of a frame, means to support the work, a spindle, a polygonal cutter mounted in the end of the spindle and having a less number of sides than the hole to be cut, means to reciprocate the spindle, intermittently actuated revoluble means mounted in the frame for carrying the spindle in a circular path a portion of a revolution at each reciprocation, and means to revolve the spindle on its own axis in the opposite direction a portion of a revolution at each reciprocation.

6. In a machine for cutting polygonal holes, the combination of a frame, means to support the work, a bushing revoluble in the frame, a second bushing revoluble and eccentrically mounted within the first, a spindle eccentrically mounted within the inner bushing, means to reciprocate the spindle, intermittently actuated means to revolve the inner bushing to carry the spindle outward step by step and then both bushings to carry the spindle step by step in a circular path, and intermittently actuated by means to revolve the spindle on its axis.

7. In a machine for cutting polygonal holes, the combination of a frame, means to support the work, a bushing revoluble in the frame, a second bushing revolubly and eccentrically mounted within the first, a spindle eccentrically mounted within the inner bushing, means to reciprocate the spindle, intermittently actuated means to revolve the inner bushing to carry the spindle outward step by step and then both bushings to carry the spindle step by step in a circular path, and gears driven by the outer bushing to revolve the spindle on its axis.

8. In a machine for cutting polygonal holes, the combination of a frame, means to support the work, a bushing revoluble in the frame, a second bushing revoluble and eccentrically mounted within the first, a spindle eccentrically mounted within the inner bushing, means to reciprocate the spindle, intermittently actuated means to revolve the inner bushing to carry the spindle outward step by step and then both bushings to carry the spindle step by step in a circular path, and gears connecting the spindle and the outer bushing whereby they will be compelled to revolve in opposite directions.

9. In a machine for cutting polygonal holes, the combination of a frame, a table to support the work, a spindle, a cutter at the end thereof, a crank to reciprocate the spindle, a revoluble sleeve to carry the spindle in a circular path, and oscillating feeding means to intermittently revolve the spindle on its axis.

10. In a machine for cutting polygonal holes, the combination of a frame, a table to support the work, an eccentric bushing having a ratchet wheel, a spindle mounted in said bushing, a cutter in the end thereof, a crank and connecting rod to reciprocate the spindle in the bushing, an oscillating plate and pawl engaging said ratchet wheel to revolve the bushing to carry the spindle in a circular path, and intermittently actuated means to revolve the spindle on its axis.

11. In a machine for cutting polygonal holes, the combination of a frame, means to support the work, a bushing revoluble in the frame and having a ratchet wheel at its upper end, an oscillating plate and pawl engaging the ratchet to revolve the bushing, a spindle eccentrically mounted in said bushing, means to reciprocate the spindle in the bushing, a polygonal cutter mounted in the end of the spindle and having a smaller number of sides than the hole to be cut, and gears connected to said bushing to revolve the spindle on its axis in the direction opposite to the bushing.

12. In a machine for cutting polygonal holes, the combination of a frame, means to support the work, a bushing revoluble in the frame, a ratchet wheel connected to the bushing, an oscillating plate and a pawl engaging the ratchet wheel to revolve the bushing, a spindle mounted in said bushing, means to reciprocate said spindle at each actuation of the ratchet wheel, means to move the spindle within the bushing so its axis will be eccentric to that of the bushing, a cutter mounted in the end of the spindle, and gears connected to said bushing to revolve the spindle on its axis.

13. In a machine for cutting polygonal holes, the combination of a frame, means to support the work, a spindle, a polygonal cutter mounted in the end of the spindle and having a less number of sides than the hole to be cut, a crank and connecting rod to reciprocate the spindle, a revoluble sleeve mounted in the frame for carrying the spindle in a circular path, a pawl and ratchet mechanism to actuate said sleeve at each reciprocation of the spindle and gears driven by the sleeve to revolve the spindle on its own axis.

14. In a machine for cutting polygonal holes, the combination of a frame, means to support the work, a bushing revoluble in the frame, a second bushing revoluble and eccentrically mounted within the first, a ratchet wheel connected thereto, a spindle eccentrically mounted within the inner bushing, a crank and connecting rod to reciprocate the spindle, a pawl and ratchet mechanism engaging said ratchet wheel to revolve the inner bushing to carry the spindle outward and then both bushings to carry the spindle in a circular path, and intermittently actuated means to revolve the spindle on its axis.

15. In a machine for cutting polygonal holes, the combination of a frame, means to support the work, a bushing revoluble in the frame, a second bushing revoluble and eccentrically mounted within the first, a ratchet wheel connected thereto, a spindle eccentrically mounted within the inner bushing, a crank and connecting rod to reciprocate the spindle, a pawl and ratchet mechanism engaging said ratchet wheel to revolve the inner bushing at each revolution of the crank to carry the spindle outward and then both bushings to carry the spindle in a circular path, and gears driven by the outer bushing to revolve the spindle on its axis.

16. In a machine for cutting polygonal holes, the combination of a frame, means to support the work, a bushing revoluble in the frame, a second bushing revoluble and eccentrically mounted within the first, and having a ratchet wheel at its upper end, a spindle eccentrically mounted within the inner bushing, a crank and connecting rod to reciprocate the spindle, a reciprocating plate mounted concentric with the spindle, a pawl on the plate to engage the ratchet wheel to revolve the inner bushing to carry the spindle outward and then both bushings to carry the spindle in a circular path, and gears connecting the spindle and the outer bushing whereby they will be compelled to revolve in opposite directions.

17. In a machine for cutting polygonal holes, the combination of a frame, means to support the work, a crank shaft revolubly mounted on the frame, a bearing mounted on the frame below the shaft, a bushing revoluble in the bearing and having an eccentric bore, a second bushing revoluble in the first also having an eccentric bore and having a ratchet wheel at its upper end, a spindle slidable in the bore of the inner bushing, a rod connecting the crank shaft and spindle to reciprocate the same, a pawl carrier mounted concentric with the spindle and having a ratchet to engage the ratchet wheel, means to actuate said pawl carrier, and stops mounted on said bushings whereby the inner bushing may revolve the outer when the stops engage.

18. In a machine for cutting polygonal holes, the combination of a frame, means to support the work, a crank-shaft revolubly mounted on the frame, a bearing mounted on the frame below the shaft, a bushing revoluble in the bearing and having an eccentric bore, a second bushing revoluble in the first also having an eccentric bore and having a ratchet wheel at its upper end, a spindle slidable in the bore of the inner bushing, a rod connecting the crank-shaft and spindle to reciprocate the same, a cutter at the lower end of the spindle, a pawl carrier mounted concentric with the spindle and having a ratchet to engage the ratchet wheel, means to actuate said pawl carrier, stops mounted on said bushings whereby the inner bushing may revolve the outer when the stops engage, and means to adjust the stop on the outer bushing so that the eccentricity of the spindle may be predetermined.

19. In a machine for cutting polygonal holes, the combination of a frame, means to support the work, a crank-shaft revolubly mounted on the frame, a bearing mounted on the frame below the shaft, a bushing revoluble in the bearing and having an eccentric bore, a second bushing revoluble in the first also having an eccentric bore and having a ratchet wheel at its upper end, a spindle slidable in the bore of the inner bushing, a rod connecting the crank-shaft and spindle to reciprocate the same, a cutter at the lower end of the spindle, a pawl carrier mounted concentric with the spindle and having a pawl to engage the ratchet wheel, means to actuate said pawl carrier, stops mounted on said bushings whereby the inner bushing may revolve the outer when the stops engage, means to adjust the stop on the outer bushing so that the eccentricity of the spindle may be predetermined, and gearing connecting to the outer bushing and to the spindle whereby the bushing will revolve the spindle.

20. In a machine for cutting polygonal holes, the combination of a frame, an eccentric bushing revoluble therein, a second bushing of equal eccentricity revoluble in the first, a spindle slidably mounted in the inner bushing, stops secured to both bushings to position the same to place the spindle concentric with the outer bushing, an adjustable stop connected to said outer bushing, means to position the same to predetermine the eccentricity of the spindle, means to revolve the inner bushing to move the spindle to a position eccentric to the outer bushing until the adjustable stop limits such movement and then revolve both bushings as a unit to carry the spindle in a circular path, and means to reciprocate said spindle.

21. In a machine for cutting polygonal holes, the combination of a frame, an eccentric bushing revoluble therein, a second bushing of equal eccentricity revoluble in the first, a spindle slidably mounted in the inner bushing, fixed stops on both bushings to position the same to place the spindle concentric with the outer bushing, a worm-gear secured to said outer bushing, a ring revoluble adjacent thereto, a worm revolubly mounted thereon in engagement with said worm-gear, a stop on said ring adapted to be positioned by the worm relative to the fixed stop on the outer bushing, means to revolve the inner bushing to move the spindle to a position eccentric to the outer bushing until the adjustable stop limits such movement and then both bushings as a unit to carry the spindle in a circular path, means to revolve the spindle on its axis, and means to reciprocate said spindle.

22. In a machine for cutting polygonal holes, the combination of a frame, a table to support the work, an eccentric bushing having a ratchet wheel with two rings of teeth, the teeth of said rings extending in opposite directions, a spindle mounted in said bushing, means to reciprocate the same, an oscillating plate mounted adjacent said ratchet wheel, a pawl thereon to engage one ring of teeth to revolve the bushing to carry the spindle outward, a second pawl on said plate to engage the other ring of teeth to revolve the bushing in the opposite direction to carry the spindle inward, and means to control the effective movement of the second pawl.

In testimony whereof I have signed this specification in the presence of two subscribing witnesses.

ALLAN H. MARSH.

Witnesses:
Roy L. Piper,
E. A. Finney.